(12) United States Patent
Carmi

(10) Patent No.: US 10,074,190 B2
(45) Date of Patent: Sep. 11, 2018

(54) TEXTURE ANALYSIS MAP FOR IMAGE DATA

(71) Applicant: KONINKLIJKE PHILIPS N.V., Eindhoven (NL)

(72) Inventor: Raz Carmi, Haifa (IL)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 17 days.

(21) Appl. No.: 15/521,722

(22) PCT Filed: Oct. 30, 2015

(86) PCT No.: PCT/IB2015/058382
§ 371 (c)(1),
(2) Date: Apr. 25, 2017

(87) PCT Pub. No.: WO2016/067254
PCT Pub. Date: May 6, 2016

(65) Prior Publication Data
US 2017/0243364 A1  Aug. 24, 2017

Related U.S. Application Data

(60) Provisional application No. 62/072,579, filed on Oct. 30, 2014.

(51) Int. Cl.
*G06T 7/45* (2017.01)
*G06T 11/00* (2006.01)
*G06K 9/46* (2006.01)

(52) U.S. Cl.
CPC .............. *G06T 7/45* (2017.01); *G06K 9/4642* (2013.01); *G06T 11/008* (2013.01); *G06T 2207/10081* (2013.01)

(58) Field of Classification Search
CPC . G06T 7/40; G06T 11/008; G06T 7/41; G06T 7/45; G06T 11/001; G06T 7/42;
(Continued)

(56) References Cited

U.S. PATENT DOCUMENTS 8,160,296 B2 * 4/2012 O'Hara ................. G06T 7/2053
348/140
9,092,691 B1 * 7/2015 Beaumont ............ G06T 7/0014
(Continued)

FOREIGN PATENT DOCUMENTS

CN  102542562  7/2012
WO  2007029129  3/2007

OTHER PUBLICATIONS

Carmi, et al., "Complementary tumor vascularity imaging in a single PET-CT routine using FDG early dynamic blood flow and contrast-enhanced CT texture analysis", Progress in Biomedical Optics and Imaging, SPIE, vol. 9038, 2014.
(Continued)

*Primary Examiner* — Jingge Wu

(57) ABSTRACT

A method includes obtaining at least a first energy dependent spectral image volume and a second different energy dependent spectral image volume from reconstructed spectral image data. The method further includes generating a multi-dimensional spectral diagram that maps, for each voxel, a value of the first energy dependent spectral image volume to a corresponding value of the second energy dependent spectral image volume. The method further includes generating a set of spectral texture analysis weights from the multi-dimensional spectral diagram. The method further includes retrieving a set of texture analysis functions, which are generated as a function of voxel intensity and voxel gradient value from a co-occurrence matrix histogram. The method further includes generating a texture analysis map through a texture analysis of the reconstructed spectral
(Continued)

image data with the set of texture analysis functions and the set of spectral texture analysis weights and visually presenting the texture analysis map.

26 Claims, 7 Drawing Sheets

(58) Field of Classification Search
CPC ...... G06K 9/46; G06K 9/4604; G06K 9/4642; G06K 9/4652
See application file for complete search history.

(56) References Cited

U.S. PATENT DOCUMENTS

| | | | |
|---|---|---|---|
| 9,600,877 B2 | 3/2017 | Carmi | |
| 2010/0002929 A1* | 1/2010 | Sammak | G06K 9/00127 |
| | | | 382/133 |
| 2010/0142775 A1 | 6/2010 | Ganeshan | |
| 2010/0266179 A1 | 10/2010 | Ramsay | |
| 2010/0329529 A1* | 12/2010 | Feldman | G06K 9/6252 |
| | | | 382/131 |
| 2011/0272161 A1* | 11/2011 | Kumaran | G01V 1/301 |
| | | | 166/369 |
| 2012/0114205 A1* | 5/2012 | Tang | G06K 9/4604 |
| | | | 382/131 |
| 2014/0037161 A1 | 2/2014 | Rucker | |
| 2014/0049491 A1* | 2/2014 | Nagar | G06F 3/016 |
| | | | 345/173 |
| 2014/0133729 A1* | 5/2014 | Goshen | G06T 5/002 |
| | | | 382/131 |
| 2016/0058288 A1* | 3/2016 | DeBernardis | A61B 5/0077 |
| | | | 600/477 |
| 2016/0187199 A1* | 6/2016 | Brunk | G01J 3/2823 |
| | | | 348/89 |
| 2016/0203599 A1* | 7/2016 | Gillies | A61B 6/463 |
| | | | 382/132 |
| 2016/0217566 A1* | 7/2016 | Carmi | G06T 5/002 |
| 2017/0228857 A1* | 8/2017 | Carmi | G06T 5/50 |
| 2018/0027224 A1* | 1/2018 | Javidnia | H04N 13/239 |
| | | | 382/154 |

OTHER PUBLICATIONS

Davnall, et al., "Assessment of tumor heterogeneity: an emerging imaging tool for clinical practice?", Insights Imaging (2012) 3:573-589.

* cited by examiner

TEXTURE ANALYSIS MAP FOR IMAGE DATA

CROSS REFERENCE TO RELATED APPLICATIONS

This application is the U.S. National Phase application under 35 U.S.C. § 371 of International Application No. PCT/IB2015/058382, filed Oct. 30, 2015, published as WO 2016/067254 on May 6, 2016, which claims the benefit of U.S. Provisional Patent Application No. 62/072,579 filed Oct. 30, 2014. These applications are hereby incorporated by reference herein.

FIELD OF THE INVENTION

The following generally relates to imaging and, more particularly, to calculating a texture analysis map for image data, and finds particular application to a computed tomography (CT) scanner configured for spectral (energy dependent) imaging. However, the following is also amenable to other imaging modalities such as, but not limited to, magnetic resonance (MR), single photon emission computed tomography (SPECT), positron emission tomography (PET), ultrasound (US), and/or other imaging modalities.

BACKGROUND OF THE INVENTION

A CT scanner includes an x-ray tube mounted on a rotatable gantry that rotates around an examination region about a z-axis. A detector array subtends an angular arc opposite the examination region from the x-ray tube. The x-ray tube emits radiation that traverses the examination region. The detector array detects radiation that traverses the examination region and generates projection data indicative thereof. A reconstructor processes the projection data and generates volumetric image data indicative of the examination region. However, the volumetric image data does not reflect the spectral characteristics as the signal output by the detector array is proportional to the energy flux integrated over the energy spectrum.

A CT scanner configured for spectral (energy dependent) CT has included a single broad spectrum x-ray tube and an energy-resolving detector array with energy-resolving detectors (e.g., with photon counting detectors, at least two sets of scintillator-photodiode layers with different spectral sensitivities, etc.) and discrimination electronics, a single x-ray tube configured to switch between at least two different emission voltages (e.g., 80 kVp and 140 kVp) during scanning, and/or two or more x-ray tubes configured to emit radiation having different mean spectra. A reconstructor decomposes the signal from the detector into various energy dependent components and reconstructs the individual components, generating spectral volumetric image data that reflects the spectral characteristics, and/or combines the components to produce non-spectral volumetric image data.

Characterization of tissue vascularity and related pathologies such as angiogenesis, necrosis and hypoxia can improve cancer diagnosis by providing valuable information, which can complement other, more standard, techniques such as metabolic FDG-PET and anatomical CT. For instance, cancerous tissue with increased angiogenesis frequently shows increased heterogeneity and irregularity of the blood vessel mesh within or around lesions. In addition, tumor hypoxia or necrosis in the interior of a tumor may show distinguished lower texture characteristics relative to the tumor boundaries. The literature has shown that histogram-based entropy and uniformity are significant descriptors in the practical assessing of the texture coarseness and irregularity of malignant tissues.

With conventional (non-spectral) texture analysis techniques, with respect to spectral CT volumetric image data, it is possible to analyze texture that either arises from attenuation value distribution (related to material density) or, alternatively, its derived spectral image results such as iodine maps. Unfortunately, with respect to spectral CT volumetric image data, it is not possible with conventional (non-spectral) texture analysis techniques to analyze organ and tissue textures in a way which inherently takes into account the full spectral CT information. In addition, conventional CT texture analysis methods usually generate texture maps with lower spatial resolution relative to the original processed spectral CT volumetric image data.

SUMMARY OF THE INVENTION

Aspects described herein address the above-referenced problems and others.

In one aspect, a method for generating a texture analysis map from spectral image data is described. The method includes obtaining at least a first energy dependent spectral image volume and a second energy dependent spectral image volume from reconstructed spectral image data. The first and second energies are different. The method further includes generating a multi-dimensional spectral diagram that maps, for each voxel of the reconstructed spectral image data, a value of the first energy dependent spectral image volume to a corresponding value of the second energy dependent spectral image volume. The method further includes generating a set of spectral texture analysis weights from the multi-dimensional spectral diagram. The method further includes retrieving a set of texture analysis functions, which are generated as a function of voxel intensity and voxel gradient value from a co-occurrence matrix histogram. The method further includes generating the texture analysis map through a texture analysis of the reconstructed spectral image data with the set of texture analysis functions and the set of spectral texture analysis weights. The method further includes visually presenting the texture analysis map.

In another aspect, an imaging system includes a reconstruction processor configured to reconstruct, using a spectral basis decomposition algorithm, spectral imaging data to generate at least a first energy dependent spectral image volume and a second energy dependent spectral image volume and a spectral data texture processor. The processor is configured to: generate a multi-dimensional spectral diagram that maps, for each voxel, a value of the first energy dependent spectral image volume to a corresponding value of the second energy dependent spectral image volume, generate a set of spectral texture analysis weights from the multi-dimensional spectral diagram, generate a set of texture analysis functions as a function of voxel intensity and voxel gradient value from a co-occurrence matrix histogram, generate the texture analysis map through a texture analysis of the reconstructed spectral image data with the set of texture analysis functions and the set of spectral texture analysis weights, visually present the texture analysis map.

In another aspect, a method for generating a texture analysis map is described. The method includes generating a multi-dimensional diagram for reconstructed imaging data. The method further includes generating a set of texture analysis weights from the multi-dimensional spectral diagram. The method further includes calculating an initial distribution of spatial weights for a co-occurrence matrix histogram. The method further includes generating a set of texture analysis functions as a function of voxel intensity and voxel gradient value from the co-occurrence matrix histogram. The method further includes generating the texture analysis map through a texture analysis of the reconstructed spectral image data with the set of texture analysis functions and the set of spectral analysis weights. The method further includes calculating an updated distribution of spatial weights for the co-occurrence matrix histogram based on a local difference between voxel values in the texture analysis map. The method further includes generating an updated set of texture analysis functions using the updated distribution of spatial weights for the co-occurrence matrix histogram. The method further includes generating a refined texture analysis map with the updated set of texture analysis functions and the set of spectral analysis weights.

The invention may take form in various components and arrangements of components, and in various steps and arrangements of steps. The drawings are only for purposes of illustrating the preferred embodiments and are not to be construed as limiting the invention.

DETAILED DESCRIPTION OF EMBODIMENTS

Figure 1:
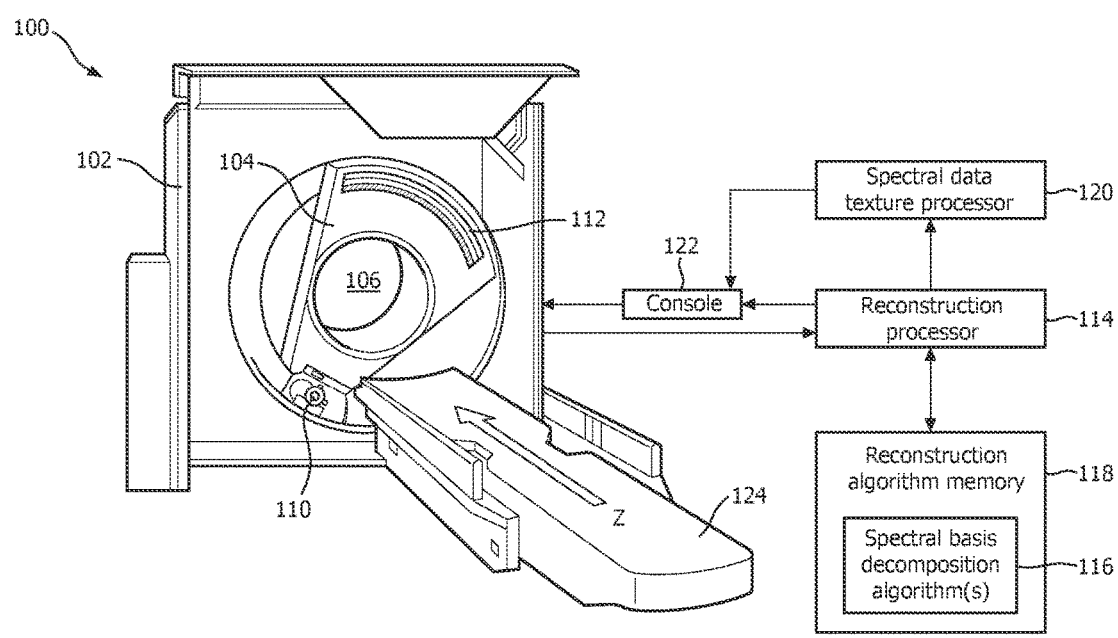
FIG. 1 schematically illustrates an example imaging system in connection with a spectral data texture processor.

FIG. 1 illustrates an example imaging system 100. Suitable imaging modalities include CT, MR, SPECT, PET, US, etc. For sake of brevity and clarity, the following describes embodiments herein in connection with CT. However, the skilled artisan (e.g., in the field of medical imaging and/or other field) will understand, from at least solely the description herein, modifications and/or alterations for the other suitable imaging modalities without undue experimentation. The illustrated imaging system 100 includes a stationary gantry 102 and a rotating gantry 104, which is rotatably supported by the stationary gantry 102. The rotating gantry 104 rotates around an examination region 106 about a longitudinal or z-axis "Z".

A radiation source 110, such as an x-ray tube, is rotatably supported by the rotating gantry 104, rotates with the rotating gantry 104, and emits x-ray radiation that traverses the examination region 106. In one instance, the radiation source 110 is configured to switch an emission voltage between two or more emission voltages (e.g., 80 and 140 kVp, 80, 100 and 120 kVp, etc.) within an integration period and/or otherwise. In a variation, the imaging system 100 includes multiple radiation sources 110 that emit radiation at different emission voltages. In another variation, the radiation source 110 includes a single broad spectrum x-ray tube.

A detector array 112 subtends an angular arc opposite the examination region 106 relative to the radiation source 110. The detector array 112 detects radiation that traverses the examination region 106 and generates a signal (projection data) indicative thereof. Where the radiation source voltage is switched between at least two emission voltages and/or two or more x-ray tubes emit radiation at two different emission voltages, the detector array 112 generates a signal for each of the radiation source voltages. For a single broad spectrum x-ray tube, the detector array 112 includes an energy-resolving detector (e.g., multi-layered scintillator/photodiode, a direct conversion photon counting, etc.) that produces the signals.

A reconstruction processor 114 reconstructs the signal with one or more spectral bases decomposition algorithms 116 stored in reconstruction algorithm memory 118 or elsewhere. The reconstruction processor 114, employing at least one of the algorithms 116, produces the spectral volumetric image data including two or more sets of volumetric image data corresponding to different image bases. For example, with dual energy these bases can be photo electric/Compton scatter pairs, water/iodine pairs (or other material base pairs), two different effective keV x-ray energy pairs, etc. In another example, with photon counting CT, the reconstruction processor 114 can generate two or more image bases, including a k-edge image basis, e.g., where there are three or more energy windows. The reconstruction processor 114 may also generate non-spectral volumetric image data.

A spectral data texture processor 120 calculates a texture analysis map from the reconstructed spectral projection data. As described in greater detail below, in one instance, this includes generating and using weights that optimize both material-density texture and material-type texture by (directly or indirectly) using information from a multi-dimensional spectral diagram and evaluating the two effects together to generate a unified texture analysis map. It is to be appreciated that the texture analysis map described herein can be used to analyze organ and tissue textures, taking into account the full spectral information. Furthermore, the spectral data texture processor 120 may refine the texture analysis through one or more iterations using intermediate generated texture analysis maps to produce a higher resolution texture analysis, relative to a texture analysis in which the refinement is omitted.

It is to be understood that the spectral data texture processor 120 can be implemented via one or more processors such as a central processing unit (CPU), a microprocessor, and/or other processor. The one or more processors execute one or more computer executable instructions embedded or encoded on computer readable storage medium, which excludes transitory medium and includes physical memory and/or other non-transitory medium. In a variation, a computer executable instruction is carried by transitory medium such as a carrier wave, signal, and/or other transitory medium.

A computer serves as an operator console 122. The operator console 122 includes a human readable output device such as a monitor and an input device such as a keyboard, mouse, etc. Software resident on the console 122 allows the operator to interact with and/or operate the scanner 100 via a graphical user interface (GUI) or otherwise. In one instance, the console 122 includes or implements the spectral data texture processor 120. In another instance, the spectral data texture processor 120 is part of a computing system separate from the imaging system 100. A subject support 124 such as a couch supports a human or animal subject or an object in the examination region 106.

Figure 2:
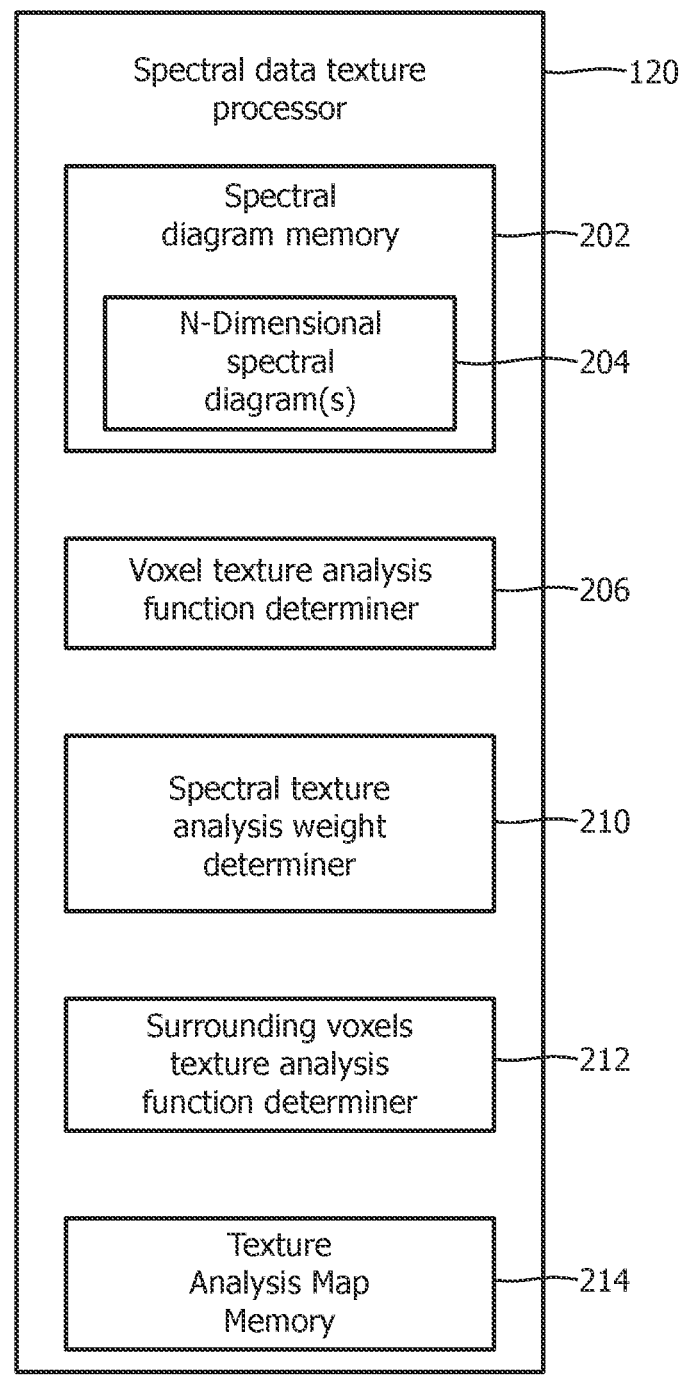
FIG. 2 schematically illustrates an example of the spectral data texture processor.

FIG. 2 illustrates an example of the spectral data texture processor 120.

The spectral data texture processor 120 receives, as input, the spectral volumetric image data reconstructed by the reconstruction processor 114, other processor of the imaging system 100, and/or other imaging system. Alternatively, the spectral volumetric image data can be obtained, retrieved from, received by, etc. a data repository such as a picture archiving and communication system (PACS), a hospital information system (HIS), an electronic medical record (EMR), a server, a database, and/or other data repository.

Spectral diagram memory 202 stores one or more N-dimensional spectral diagrams 204, wherein N is a positive integer. An N-dimensional spectral diagram of the N-dimensional spectral diagrams 204 includes, for each position (e.g., voxel) in the reconstructed spectral projection data, corresponding values from each spectral base image. These values can be retrieved from the N-dimensional spectral diagram. The N-dimensional spectral diagram, in general, serves as a coordinate along the corresponding diagram axis.

Figure 3:
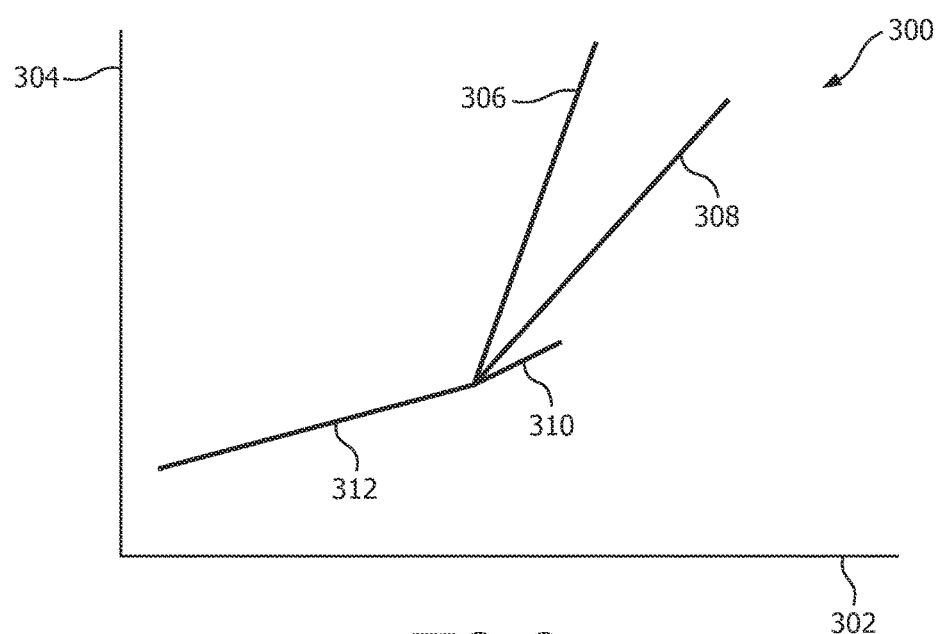
FIG. 3 illustrates an example 2D spectral diagram.

An example of a N-D spectral diagram 300 for two (N=2) spectral bases is shown in FIG. 3. An x-axis 302 represents first spectral base voxel values, and a y-axis 304 represents second spectral base voxel values. A first vector 306 represents a first basis material, a second vector 308 represents a second basis material, a third vector 310 represents a third basis material, and a fourth vector 312 represents a fourth basis material. In other instance, the N-D spectral diagram includes more, less and/or a different basis material(s). Examples of suitable basis materials include, but are not limited to, iodine, calcium, soft tissue, air, and/or water.

Returning to FIG. 2, a voxel texture analysis function determiner 206 determines texture analysis functions as a function of voxel intensity values and voxel gradient values. Texture analysis functions are determined and stored in texture analysis function memory. A particular texture analysis function(s) utilized can be a default set, identified from user preferences, selected by the user using pre-specified presets, etc. In one instance, the texture analysis functions determined using an entropy of a co-occurrence matrix histogram.

Figure 4:
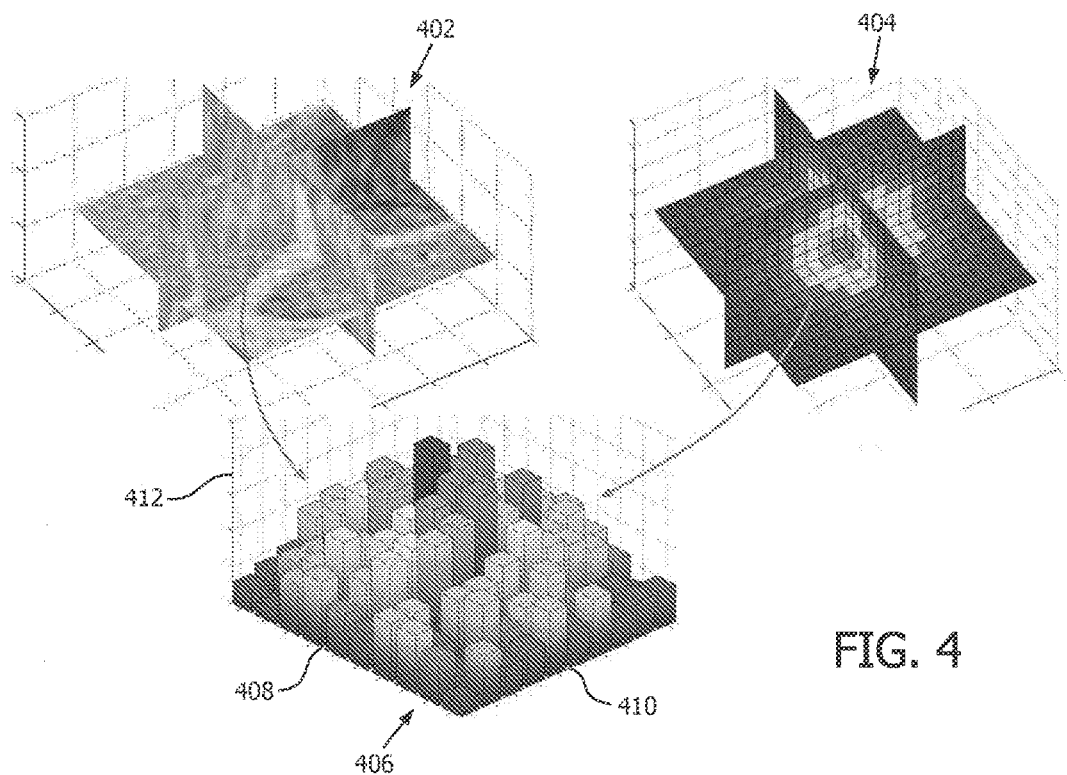
FIG. 4 illustrates an example co-occurrence matrix histogram.

FIG. 4 shows a non-limiting example for determining a texture analysis function. The reconstructed spectral projection data is shown in 3D space at 402. A 3D Gaussian weight mask determined by a clustering length of interest about a voxel is shown as 404. A co-occurrence histogram is shown at 406. For the co-occurrence matrix histogram, a first axis 408 represents bins along voxel values, e.g., using a Hounsfield units (HU) scale, a second axis 410 represents bins along gradients, e.g., using a Hounsfield units/millimeter (HU/mm) scale, and a third axis 412 represents an intensity probability.

The co-occurrence matrix histogram can be created using known and/or other approaches. For example, in one instance, for each voxel in the reconstructed spectral projection data 402, the weighted co-occurrence matrix histogram 406 is determined from the voxel value distribution in a predetermined vicinity (e.g., the six surrounding voxels bounding the six sides of the voxel) about the voxel. For this, initially, the 3D Gaussian weight mask 404 is defined for the surrounding voxels. The 3D Gaussian weight mask $W_0(i, j, k)$ can be calculated as shown in EQUATION 1:

$$W_0(i,j,k) = \exp(-(i^2 \cdot r_x^2 + j^2 \cdot r_y^2 + k^2 \cdot r_z^2)/2/\xi^2), \quad \text{EQUATION 1:}$$

where $[r_x, r_y, r_z]$ are the length/pixel ratios (e.g., millimeter/pixel, of mm/pixel) in the reconstructed spectral projection data and [i j k] are voxel indexes around a central voxel in [0 0 0] for which $W_0$ is above a pre-determined threshold.

A normalized weight mask W is derived to satisfy, e.g., $\Sigma_v W_v = 1$, where $W_v$ are all the mask values. The Gaussian width $\xi$ (e.g., in mm) determines the histogram clustering length. The co-occurrence matrix is built from the local HU values and their absolute 3D gradients. The weighted co-occurrence histogram is constructed for each image voxel in a process in which each voxel covered by the mask (i.e. in the vicinity of the currently analyzed image voxel which is aligned with the center of the mask) adds the corresponding mask local weight to the height (or intensity 412) of the related histogram bin.

The related bin matrix indexes are determined by the image voxel HU value in one dimension of the matrix, and the gradient value in the second matrix dimension. The weighting pattern, which is decreased gradually out of the mask central voxel, will contribute to smooth and less-patchy appearance of the irregularity map. The final histogram is normalized to satisfy $\Sigma_{i,j} p_{i,j} = 1$, where i, j are the matrix bin indexes and $p_{i,j}$ is the corresponding bin height (i.e. matrix element value).

Other approaches are also contemplated herein. For example, another suitable approach is described in patent application WO/2014/097124, serial number PCT/IB2013/060995, filed Dec. 16, 2013, and entitled "QUANTITATIVE IMAGING," the entirety of which is incorporated herein by reference. Another approach is described in R. Carmi et al., "Complementary tumor vascularity imaging in a single PET-CT routine using FDG early dynamic blood flow and contrast-enhanced CT texture analysis," SPIE Medical Imaging 2014.

The voxel texture analysis function determiner 206 derives a set of texture analysis functions from the co-occurrence histogram 406. One such function that describes heterogeneity and irregularity is entropy. For this, initially, a pre-scaled entropy $S_0$ is calculated from the co-occurrence histogram for each image voxel by: $S_0 = -\Sigma_{i,j} p_{i,j} \log(p_{i,j})$, where i, j are the bin indexes and $p_{i,j}$ is the bin height. Other approaches are also contemplated herein. This includes the approach discussed in Davnall et al., "Assessment of tumor heterogeneity: an emerging imaging tool for clinical practice?", Insights Imaging, October 2012.

Figure 5:
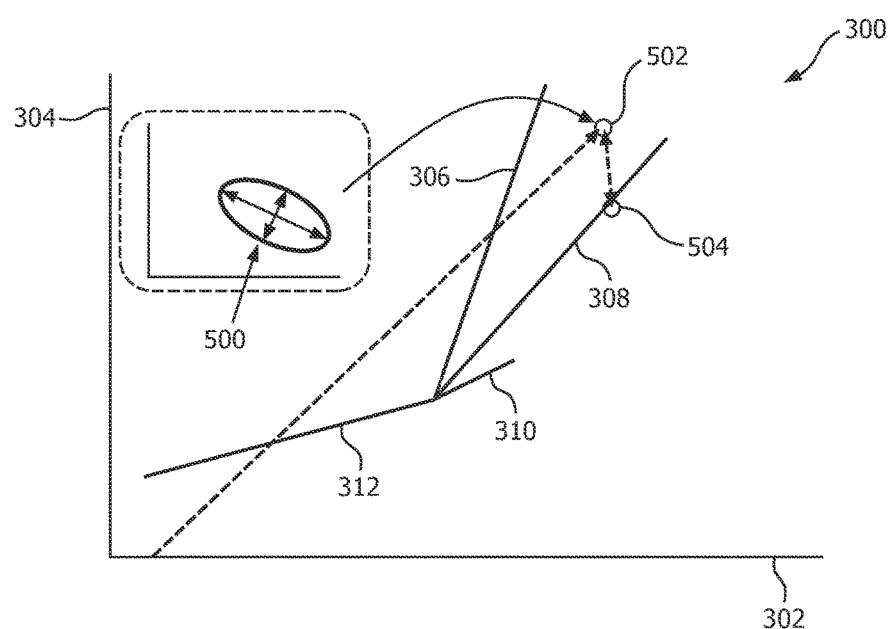
FIG. 5 illustrates a dependency of weights of the co-occurrence matrix histogram on vector length and vector-differences in the spectral diagram.

Returning to FIG. 2, a spectral texture analysis weight determiner 210 determines a set of spectral texture weights. In one instance, this is achieved based on locations and vector directions in an N-D spectral diagram such as the 2D spectral diagram of FIG. 3. An example of this is shown in FIG. 5. In FIG. 5, a weight 500 is determined for a voxel 502 in the spectral diagram 300 and for each possible vector-difference (gradient) direction that can be calculated with relation to the values of neighbor voxels (e.g., a voxel 504) in the physical space, or voxels with other type of spatial proximity. The dependency on the gradient direction allows for optimal mixing of material density effect and material spectral separation effect within the calculated co-occurrence matrix histogram 406. The set of spectral texture weights provides weight tables.

Returning to FIG. 2, a surrounding voxels texture analysis function determiner 206 determines, for a voxel of interest, texture analysis functions of voxels surrounding the voxel of interest, e.g., a pre-determined group of voxel around the voxel. For example, in one instance, voxel intensity as a function of the corresponding vector length in the N-D spectral diagram is determined. In another instance, a voxel gradient as a function of a difference-vector between two vectors in the N-D spectral diagram, corresponding to spatially adjacent or close voxels in the physical space, is determined. For this, the voxel gradient is weighted based on the gradient direction in the N-D spectral diagram.

For example, for the voxel 502 in FIG. 5, the vector length in the spectral diagram is calculated and the gradient in 3D is calculated based on the vector difference values of a predetermined set (e.g., the six bounding) closest neighboring voxels. The gradient weight for mapping this voxel into the co-occurrence histogram is determined by the weight tables. The mean weight value, corresponding to the six vector-differences with respect to the six neighbor voxels, can be taken. In another example, the voxel intensity can be related to the first axis of a co-occurrence histogram. The absolute value of the gradient, after the proper weighting, can be related to the second axis of the co-occurrence histogram.

Figure 6:
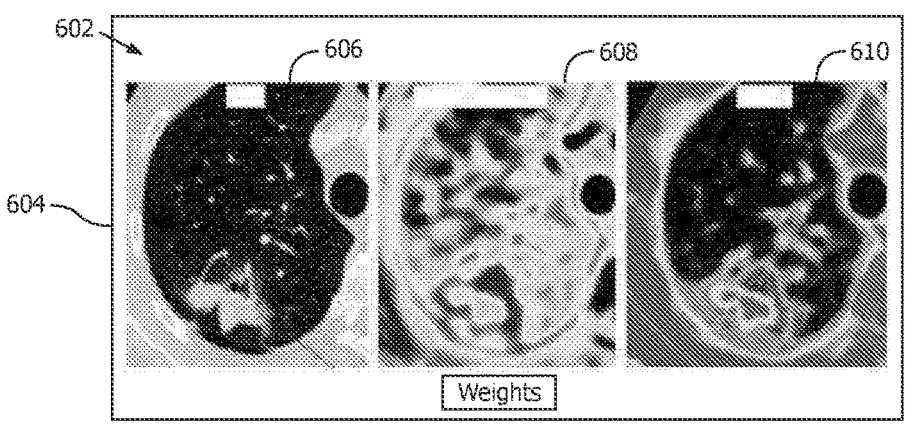
FIG. 6 illustrates visual display of an image of a volumetric spectral image data, a corresponding texture analysis map for the image, and a fused image, which is a combination of the image and the texture analysis map.

The resulting texture analysis maps can be stored in texture analysis map memory 214, visualized, conveyed to another device, further processed, etc. FIG. 6 shows an image viewing window 602 of a display monitor 604 of the console 122 displaying an image 606 or slice of the volumetric spectral image data, a corresponding texture analysis map 608 for the image 606, and a fused image 610, which is a combination of the image 606 and the texture analysis map 608. The texture analysis map 608 represents in a unified way both the 'material density texture' and the 'material-type texture', which can be identified by the spectral effect.

In the illustrated example, the weights are visually presented in the image viewing window 602 and/or other viewing area. Furthermore, an operator can use controls of the console 122 to interactively change a weight between the 'material density texture' and the 'material-type texture'. Furthermore, separate 'material density' texture and 'material type' texture maps can be calculated and visually presented in the image viewing window 602.

As described herein, texture analysis maps can be calculated for each voxel in the volumetric image data. However, a local assessment includes statistical analysis of many voxels around the specific analyzed voxel. As a result, the texture analysis map may have a relatively lower resolution compared to the volumetric image data. EQUATION 1 provides an example spatial weight function for generating the co-occurrence matrix histogram The histogram "clustering length" $\xi$ can be, e.g., on the order of three millimeters (3 mm) for achieving a "best" texture map definition in a specific case. This length limits a spatial resolution of the texture analysis map.

The spatial resolution of the texture analysis map, in one instance, is increased by adding a local weight, which depends on a difference between calculated texture map values of two relevant voxels, e.g., for each instance in an algorithm loop. For that purpose, the reference texture map is taken from a previous iteration, and the process generates a refined texture map. Generally, smaller sub-regions, which were analyzed (at an intermediate step) with similar texture values, will have higher weights in the analyzed larger cluster that is used for calculating the refined texture.

The local weight can be added to EQUATION 1 as shown in EQUATION 2:

$$W_0(i,j,k) = [\exp(-(i^2 \cdot r_x^2 + j^2 \cdot r_y^2 + k^2 \cdot r_z^2)/2/\xi^2)] \times [\exp(-(T_{i,j,k} - T_{0,0,0})^2/2/\sigma^2)],$$ EQUATION 2:

where $T_{i,j,k}$ is the voxel texture map value of the i,j,k indexes, $T_{0,0,0}$ is a central voxel texture map value (which is analyzed in its turn), a is a parameter related to a predetermined difference of texture map values (this can be a constant or an adaptive parameter), and T is the texture map of the preceding iteration relative to the iteration for which the weights W are determined. The weight distribution function can be normalized in a predetermined point of the algorithm.

Other approaches are also contemplated herein. The refinement of the spatial resolution of the texture analysis map can be used with texture analysis map for both spectral volumetric image data and for non-spectral volumetric image data.

Figures 7, 8, 9, 10:
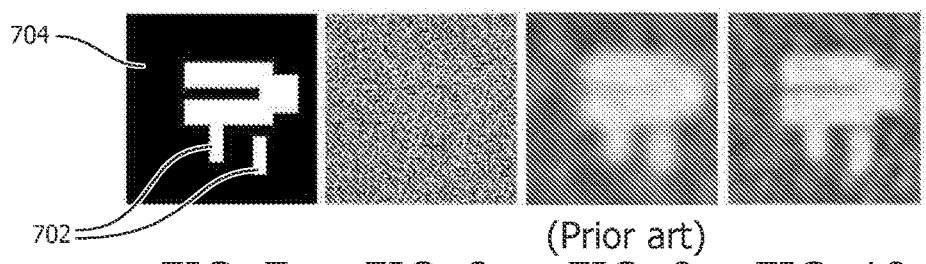
FIG. 7 shows an arbitrary pattern that defines two regions.
FIG. 8 shows an example image for the texture analysis.
FIG. 9 shows an entropy map derived from a prior-art texture analysis.
FIG. 10 shows an entropy map derived using the weight mask described herein.

FIGS. 7, 8, 9 and 10 illustrate an example of the refinement. FIG. 7 shows an arbitrary pattern that defines two regions 702 (white areas) and 704 (black area). As shown in FIG. 8, each mask region has a different type of random texture. This image is the input image for the texture analysis. FIG. 9 shows an entropy map derived from a prior-art texture analysis approach. FIG. 10 shows an entropy map derived using the weight mask of EQUATION 2 and 6 iterations. It is to be understood that this example is only for explanatory purposes; it should not be perceived as an indication of quality and/or performance.

Figure 11:
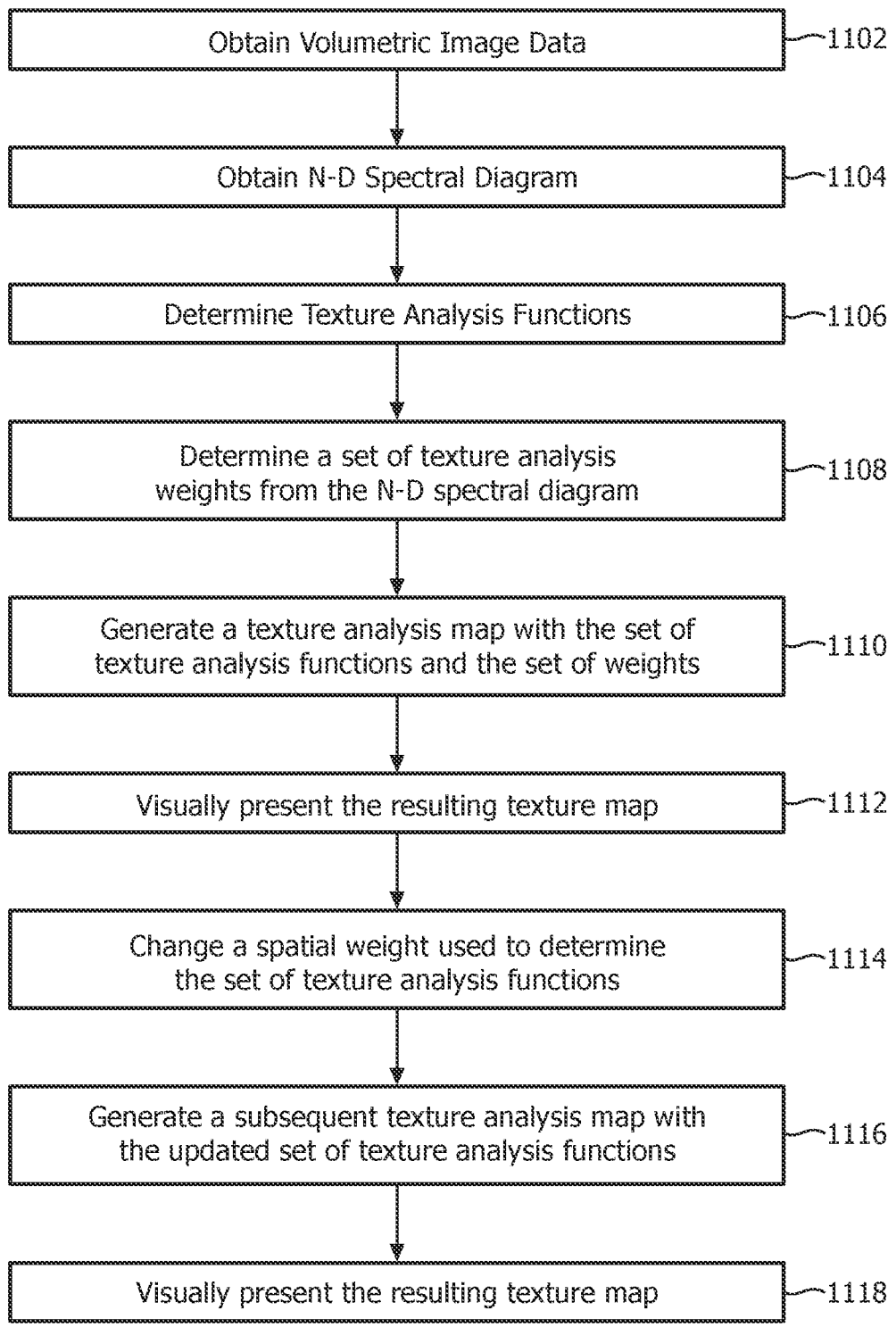
FIG. 11 illustrates an example method for generating a texture analysis map.

FIG. 11 illustrates an example method for spectral texture analysis.

It is to be appreciated that the ordering of the acts in the methods described herein is not limiting. As such, other orderings are contemplated herein. In addition, one or more acts may be omitted and/or one or more additional acts may be included.

At 1102, volumetric image data is obtained, e.g., from the imaging system 100, another imaging system, a data repository, etc. The image data can be spectral or non-spectral image data.

At 1104, an N-D spectral diagram is obtained, e.g., from computer memory or other physical memory device.

At 1106, a set of texture analysis functions are determined, e.g., based on EQUATIONS 1, 2 and/or otherwise.

At 1108, a set of texture analysis weights are determined based on the N-D spectral diagram, as described herein.

At 1110, a texture analysis map is generated with the set of texture analysis functions and the set of texture analysis weights, as described herein.

At 1112, the resulting texture analysis map can be visually presented. As described herein, the texture analysis map can be displayed by itself, concurrently or alternately with reconstructed imaging data, fused with the reconstructed imaging data, etc. Furthermore, the set of texture analysis weights can be displayed with the texture analysis map.

At 1114, an updated set of texture analysis functions are determined in response to receiving input signal indicative of a change in at least one spatial weight used to determine the set of texture analysis functions.

At 1116, a subsequent texture analysis map is generated with the updated texture analysis functions and the set of texture analysis weights.

At 1118, the subsequent spectral texture analysis map is visually presented. Likewise, the subsequent texture analysis map can be displayed by itself, concurrently or alternately with reconstructed imaging data, fused with the reconstructed imaging data, etc. Furthermore, the set of texture analysis weights can be displayed with the texture analysis map.

It is to be understood that acts 1114-1118 are performed only if there is change to a weight. Otherwise, acts 1114-1118 are omitted or not performed.

The above may be implemented by way of computer readable instructions, encoded or embedded on computer readable storage medium, which, when executed by a computer processor(s), cause the processor(s) to carry out the described acts. Additionally or alternatively, at least one of the computer readable instructions is carried by a signal, carrier wave or other transitory medium.

The invention has been described with reference to the preferred embodiments. Modifications and alterations may occur to others upon reading and understanding the preceding detailed description. It is intended that the invention be constructed as including all such modifications and alterations insofar as they come within the scope of the appended claims or the equivalents thereof.

The invention claimed is:

1. A method for generating a texture analysis map from spectral image data, comprising:
    obtaining at least a first energy dependent spectral image volume and a second energy dependent spectral image volume from reconstructed spectral image data, wherein the first and second energies are different;
    generating a multi-dimensional spectral diagram that maps, for each voxel of the reconstructed spectral image data, a value of the first energy dependent spectral image volume to a corresponding value of the second energy dependent spectral image volume;
    generating a set of spectral texture analysis weights from the multi-dimensional spectral diagram;
    retrieving a set of texture analysis functions, which are generated as a function of voxel intensity and voxel gradient value from a co-occurrence matrix histogram;
    generating the texture analysis map through a texture analysis of the reconstructed spectral image data with the set of texture analysis functions and the set of spectral texture analysis weights; and
    visually presenting the texture analysis map.

2. The method of claim 1, further comprising:
    generating the set of spectral texture analysis weights from a location of each voxel in the multi-dimensional spectral diagram.

3. The method of claim 2, further comprising:
    generating the set of spectral texture analysis weights from voxel gradients corresponding to a set of voxels neighboring each voxel in the multi-dimensional spectral diagram.

4. The method of claim 1, further comprising:
    visually presenting the set of spectral texture analysis weights along with the texture analysis map.

5. The method of claim 1, further comprising:
    receiving an input indicative of a change in at least one spectral texture analysis weight of the set of spectral texture analysis weights;
    changing the set of spectral texture analysis weights based on the input and generating an updated set of spectral texture analysis weights; and
    generating the texture analysis map through the texture analysis of the reconstructed spectral image data with the set of texture analysis functions and the updated set of spectral texture analysis weights.

6. The method of claim 1, further comprising:
    fusing the reconstructed spectral image data and the texture analysis map to create a single fused image; and
    visually presenting the single fused image.

7. The method of claim 1, further comprising:
    visually presenting the reconstructed spectral image data and the texture analysis map in separate viewing areas of a viewing region of a display.

8. The method of claim 1, further comprising:
    using a dependency on the gradient direction to mix a material density effect and a material spectral separation in the texture analysis map.

9. The method of claim 1, wherein generating the texture analysis map comprises retrieving, for a voxel, a voxel intensity as a function of a corresponding vector length in the spectral diagram and a voxel gradient as a function of a difference-vector between two vectors in the spectral diagram, corresponding to the set of voxels neighboring the voxel.

10. The method of claim 9, further comprising:
    weighting the voxel gradient with the set of spectral texture analysis weights.

11. The method of claim 9, further comprising:
    mapping a gradient weight for a voxel into the co-occurrence matrix histogram.

12. The method of claim 11, wherein the gradient weight is a mean weight value corresponding to the set of voxels neighboring the voxel.

13. The method of claim 1, further comprising:
    calculating an initial distribution of spatial weights for the co-occurrence matrix histogram prior to generating the texture analysis map,
    wherein the texture analysis map is an intermediate texture analysis map;
    calculating an updated distribution of spatial weights for the co-occurrence matrix histogram based on a local difference between voxel values in intermediate texture analysis map;
    generating an updated set of texture analysis functions using the updated distribution of spatial weights for the co-occurrence matrix histogram; and
    generating a refined texture analysis map with the updated set of texture analysis functions.

14. The method of claim 1, further comprising:
    reconstructing, using a spectral basis decomposition algorithm, the spectral image data to generate the at least the first energy dependent spectral image volume and the second energy dependent spectral image volume.

15. An imaging system, comprising:
    a reconstruction processor configured to reconstruct, using a spectral basis decomposition algorithm, spectral imaging data to generate at least a first energy dependent spectral image volume and a second energy dependent spectral image volume; and
    a spectral data texture processor that includes a processor configured to:
        generate a multi-dimensional spectral diagram that maps, for each voxel, a value of the first energy dependent spectral image volume to a corresponding value of the second energy dependent spectral image volume;
        generate a set of spectral texture analysis weights from the multi-dimensional spectral diagram;
        generate a set of texture analysis functions as a function of voxel intensity and voxel gradient value from a co-occurrence matrix histogram;

generate the texture analysis map through a texture analysis of the reconstructed spectral image data with the set of texture analysis functions and the set of spectral texture analysis weights; and visually present the texture analysis map.

16. The imaging system of claim 15, where the processor is further configured to: generate the set of spectral texture analysis weights from a location of each voxel in the multi-dimensional spectral diagram and voxel gradients corresponding to a set of voxels neighboring each voxel in the multi-dimensional spectral diagram.

17. The imaging system of claim 15, where the processor is further configured to: change a weight of the set of spectral texture analysis weights in response to receiving an input indicative of the change; and generate the texture analysis map using the set of spectral texture analysis weights with the changed weight.

18. The imaging system of claim 15, where the processor is further configured to: visually present the set of spectral texture analysis weights along with the texture analysis map.

19. The imaging system of claim 15, where the processor is further configured to: visually present the reconstructed spectral imaging data along with the set of spectral texture analysis weights along with the texture analysis map.

20. The imaging system of claim 15, where the processor is further configured to: fuse the reconstructed spectral imaging data and the texture analysis map to create a single fused image; and visually present the single fused image.

21. The imaging system of claim 15, where the processor uses a dependency on the gradient direction to mix a material density effect and material spectral separation in the texture analysis map.

22. The imaging system of claim 15, where the processor is further configured to: create the texture analysis map by retrieving, for each voxel, a voxel intensity as a function of a corresponding vector length in the spectral diagram and a voxel gradient as a function of a difference-vector between two vectors in the spectral diagram, corresponding to the set of voxels neighboring the voxel.

23. The imaging system of claim 15, wherein the spectral imaging data includes one of computed tomography, magnetic resonance, single photon emission computed tomography, positron emission tomography and ultrasound image data.

24. A method for generating a texture analysis map, comprising:

generating a multi-dimensional diagram for reconstructed imaging data;

generating a set of texture analysis weights from the multi-dimensional spectral diagram;

calculating an initial distribution of spatial weights for a co-occurrence matrix histogram;

generating a set of texture analysis functions as a function of voxel intensity and voxel gradient value from the co-occurrence matrix histogram;

generating the texture analysis map through a texture analysis of the reconstructed spectral image data with the set of texture analysis functions and the set of spectral analysis weights;

calculating an updated distribution of spatial weights for the co-occurrence matrix histogram based on a local difference between voxel values in the texture analysis map;

generating an updated set of texture analysis functions using the updated distribution of spatial weights for the co-occurrence matrix histogram; and generating an refined texture analysis map with the updated set of texture analysis functions and the set of spectral analysis weights.

25. The method of claim 24, wherein the reconstructed imaging data is spectral imaging data.

26. The method of claim 24, wherein the reconstructed imaging data is non-spectral imaging data.

* * * * *